United States Patent
Lee

(10) Patent No.: US 6,917,395 B2
(45) Date of Patent: Jul. 12, 2005

(54) CONDUCTIVE MEMBER AND LIQUID CRYSTAL DISPLAY HAVING THE SAME

(75) Inventor: Sang-Duk Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 66 days.

(21) Appl. No.: 10/256,983

(22) Filed: Sep. 27, 2002

(65) Prior Publication Data

US 2003/0098940 A1 May 29, 2003

(30) Foreign Application Priority Data

Nov. 27, 2001 (KR) ......................................... 2001-74308

(51) Int. Cl.$^7$ .......................................... G02F 1/1333
(52) U.S. Cl. ........................................... 349/58; 349/65
(58) Field of Search ..................................... 349/56–77

(56) References Cited

U.S. PATENT DOCUMENTS

| | | | | |
|---|---|---|---|---|
| 5,032,006 A | * | 7/1991 | Grupp et al. | 349/195 |
| 5,142,644 A | * | 8/1992 | VanSteenkiste et al. | 349/86 |
| 5,148,299 A | * | 9/1992 | Terada | 349/59 |
| 5,233,451 A | * | 8/1993 | Iguchi | 349/160 |
| 5,233,452 A | * | 8/1993 | Iguchi | 349/149 |
| 5,888,076 A | * | 3/1999 | Itoh et al. | 439/74 |
| 6,552,761 B1 | * | 4/2003 | Seo et al. | 349/58 |

FOREIGN PATENT DOCUMENTS

| | | | |
|---|---|---|---|
| JP | 402171724 A | * | 7/1990 |
| JP | 406347814 A | * | 12/1994 |
| JP | 02003045516 A | * | 2/2003 |

* cited by examiner

Primary Examiner—Diane I. Lee
Assistant Examiner—Kimberly D. Nguyen
(74) Attorney, Agent, or Firm—Cantor Colburn LLP

(57) ABSTRACT

A conductive member fixes an integrated PCB to a rear surface of a mold frame and electrically connects the PCB to a top chassis. The conductive member includes a body portion contacting a sidewall of the mold frame, a first wing portion extended from a first end of the body portion coupled with an upper surface of the sidewall of the mold frame, and a second wing portion extended from a second end of the body portion coupled with a rear surface of the integrated PCB. A distance between free ends of the wing portions is less than a distance between the first and second ends of the body portion, where the conductive member is at a free existing state without any external forced applied. A tension generated by a restoring force of the wing portions fixes the PCB with the mold frame without using a separate fixing member.

8 Claims, 13 Drawing Sheets

CONDUCTIVE MEMBER AND LIQUID CRYSTAL DISPLAY HAVING THE SAME

BACKGROUND OF THE INVENTION

1. Field of the Invention

The present invention relates to a liquid crystal display, and more particularly, to a conductive member and a liquid crystal display having the same, which has a reduced number of components so as to simplify an assembling process thereof, and is reduced in weight and thickness compared with a conventional liquid crystal display.

2. Description of the Related Art

In the present information-oriented society, the role of an electronic display has become more important. Various types of electronic display devices are widely used in various industrial fields. Due to rapid advancement in semiconductor technologies, various kinds of information processing devices are smaller-sized and have a very light weight. Correspondingly, there is also provided a display device having slimmer and lighter properties as well as a lower power consumption characteristic.

A liquid crystal display includes two substrates in which electrodes are formed, and liquid crystal interposed therebetween. The liquid crystal display is a device performs a displaying operation by applying a voltage to the electrodes that realigns molecules of the liquid crystal so as to control an amount of light passing through the liquid crystal.

FIG. 1 is an exploded perspective view of a conventional liquid crystal display.

Referring to FIG. 1, a liquid crystal display (LCD) 50 includes a display unit 10 for displaying an image, a backlight assembly 20 for providing a light to the display unit 10, a mold frame 30 for receiving the display unit 10 and the backlight assembly 20, and a chassis 40 for fixing the display unit 10 to the mold frame 30. Though not shown in the drawings, the LCD 50 is received in front and rear cases (not shown).

A liquid crystal display (LCD) panel 16 of the display unit 10 comprises a thin film transistor substrate 12, a color filter substrate 11 disposed opposite the thin film transistor substrate 12, and a liquid crystal layer (not shown) formed between the two substrates 11 and 12.

In addition, the LCD panel 16 is provided with an integrated printed circuit board (PCB) 14 which provides a driving signal for driving the LCD panel 16 and a control signal for controlling an operation of the LCD panel 16. The integrated PCB 14 is connected to the LCD panel 16 by a data tape carrier package 13 electrically connected to one side of the LCD panel 16. A gate tape carrier package 15, for providing a gate signal applied from the integrated PCB 14 to a gate line of the LCD panel 16 to control the gate line, is connected to the other side of the LCD panel 16.

Below the display unit 10, there is provided the backlight assembly 20 for providing a uniform light to the display unit 10. The backlight assembly 20 comprises a lamp unit 21 for generating a light, and a light guiding plate 22 for guiding the light and then outputting the light to the display unit 10. The backlight assembly 20 further comprises a plurality of optical sheets 23 for enhancing a uniformity of the brightness of the light output from the light guiding plate 22, and a reflection plate 24 for reflecting the light leaked from the light guiding plate 22 so as to increase an amount of the light output from the light guiding plate 22.

The mold frame 30 receives the reflection plate 24, the light guiding plate 22 and the optical sheets 23 sequentially. The display unit 10 is received on an upper side of the optical sheets 23. The integrated PCB 14 is bent to enclose a first sidewall 31 of the mold frame 30 and settled on a rear surface of the mold frame 30 in order to prevent an increase in a surface area of the LCD 50.

Then, when the top chassis 40 is coupled to the mold frame 30, the display unit 10 is fixed in a receiving space of the mold frame 30, and the data tape carrier package 13 maintains a state that the tape carrier package 13 is bent toward an outside of the first sidewall 31.

A ground clip 60, as shown in FIG. 2, is coupled to a second sidewall 32 of the mold frame 30 in order to ground the integrated PCB 14 settled on the rear surface of the mold frame 30 to the top chassis 40.

However, if the ground clip 60 gets out of a fixed position due to a shock from an outside while the LCD 50 is assembled or used, an electrical connection between the integrated PCB 14 and the top chassis 40 may not be maintained. To solve the problem, there is recently proposed a method of coupling the ground clip 60 to the mold frame 30 and the top chassis 40 by a screw.

FIG. 2 is a perspective view of a conductive clip 60 for grounding the integrated PCB and the top chassis of the LCD of FIG. 1 to the earth, and FIG. 3 is a cross-sectional view showing a coupling structure of the LCD using the conductive clip 60 of FIG. 2.

Specifically, referring to FIG. 2, the ground clip 60 comprises a first coupling portion 61, and second and third coupling portions 62 and 63 extended in a same direction from opposing ends of the first coupling portion 61. The first, second and third coupling holes 61a, 62a and 63a are formed at the first, second and third coupling portions 61, 62 and 63, respectively.

As shown in FIG. 3, the first, second and third coupling portions 61, 62 and 63 are coupled to make direct contact with side, upper and lower surfaces of the second sidewall 32 of the mold frame 30, respectively. The integrated PCB 14 is partially interposed between the third coupling portion 63 and the rear surface of the mold frame 30.

As shown in FIGS. 1 to 3, the first, second and third bliend holes 32a, 32b and 32c, corresponding to the first, second and third coupling holes 61a, 62a and 63a, are formed at the side, upper and lower surfaces of the second sidewall 32 of the mold frame 32. Further, a fourth coupling hole 14a corresponding to the third bliend hole 32c is formed at an end of the integrated PCB 14. A fifth coupling hole 40a corresponding to the first coupling hole 61a is formed at a sidewall of the top chassis 40 corresponding to the second sidewall 32 of the mold frame 30.

After the ground clip 60 is coupled to the second sidewall 32 of the mold frame 30 so that the integrated PCB 14 is supported by the third coupling portion 63, a first screw 71 is inserted into the second blind hole 32b through the second coupling hole 62a. In the same way, a second screw 72 is inserted into the third blind hole 32c through the third and forth coupling holes 63a and 14a at the rear surface of the mold frame 30. Then, after the top chassis 40 is coupled to the mold frame 30, a third screw 73 is inserted into the first blind hole 32a through the fifth and first coupling holes 40a and 61a.

As described above, since the mold frame 30, the ground clip 60 and the top chassis 40 are coupled to each other using the first, second and third screws 71, 72 and 73, the ground clip 60 is stably fixed to the integrated PCB 14 and the top chassis 40, and an electrically conductive state is maintained therebetween.

However, if the screws are used to maintain the stable coupling and conductive state of the ground clip 60, the number of components of the LCD increases as a number of the screws increases, and a number of assembling processes for assembling the components increases.

In addition, in order to reduce a thickness of the LCD 50, a thickness of the sidewall of the mold frame 30 needs to be reduced. Therefore, a contact area between the ground clip 60 and the sidewall of the mold frame 30 is reduced, and it is difficult to secure a space for fastening the first, second and third screws 71, 72 and 73.

SUMMARY OF THE INVENTION

Therefore, the present invention provides a conductive member which can be strongly coupled with a mold frame of an LCD.

Also, the present invention provides a slim LCD in which the number of components and the number of assembling processes decrease by employing the conductive member.

In one aspect, there is provided a conductive member applied to a display device. The display device has a display part for receiving a light, an image signal and a control signal and displaying an image, a circuit part for providing the video signal and the control signal to the display part, a first receiving part for receiving the display part, and a second receiving part coupled to the first receiving part, for fixing a position of the display part. The conductive member connects the circuit part of the display device to the ground. The conductive member comprises a body portion, a first wing portion, and a second wing portion. The body portion is coupled to the first receiving part and the circuit part, and located between the first and second receiving parts. Then, the body portion fixes the circuit part to a rear surface of the first receiving part, and is coupled to a side surface of the first receiving part. The first wing portion is extended from a first end of the body portion in one direction to be coupled to an upper surface of a sidewall of the first receiving part. The second wing portion is extended from a second end of the body portion in the same direction as the first wing portion to be coupled to the circuit part positioned at the rear surface of the first receiving part. An interval between the first wing portion and the second wing portion becomes narrower as the first and second wing portions are farther apart from the first and second ends of the body portion.

In another aspect, there is provided an LCD. The LCD comprises a backlight assembly, an LCD panel, a printed circuit board, a receiving container, a chassis, and a conductive member. The backlight assembly generates a light. The LCD panel receives the light and displaying an image, the printed circuit board provides a control signal to the LCD panel to control an operation of the LCD panel. The receiving container receives the backlight assembly and the LCD pane. The chassis is coupled to the receiving container for fixing a position of the LCD panel. The conductive member is coupled to the receiving container and the printed circuit board between the receiving container and the chassis, for fixing the printed circuit board to a rear surface of the receiving container and electrically connecting between the printed circuit board and the chassis.

The conductive member comprises a body portion, a first wing portion, and a second wing portion. The body portion is coupled to the first receiving part and the circuit part, and located between the first and second receiving parts. Then, the body portion fixes the circuit part to a rear surface of the first receiving part, and is coupled to a side surface of the first receiving part. The first wing portion is extended from a first end of the body portion in one direction to be coupled to an upper surface of a sidewall of the first receiving part. The second wing portion is extended from a second end of the body portion in the same direction as the first wing portion to be coupled to the circuit part positioned at the rear surface of the first receiving part. An interval between the first wing portion and the second wing portion becomes narrower as the first and second wing portions are farther apart from the first and second ends of the body portion.

BRIEF DESCRIPTION OF THE DRAWINGS

The above objects and other advantages of the present invention will become more apparent by describing in detail exemplary embodiments thereof with reference to the attached drawings in which.

DETAILED DESCRIPTION OF THE INVENTION

Figure 1:
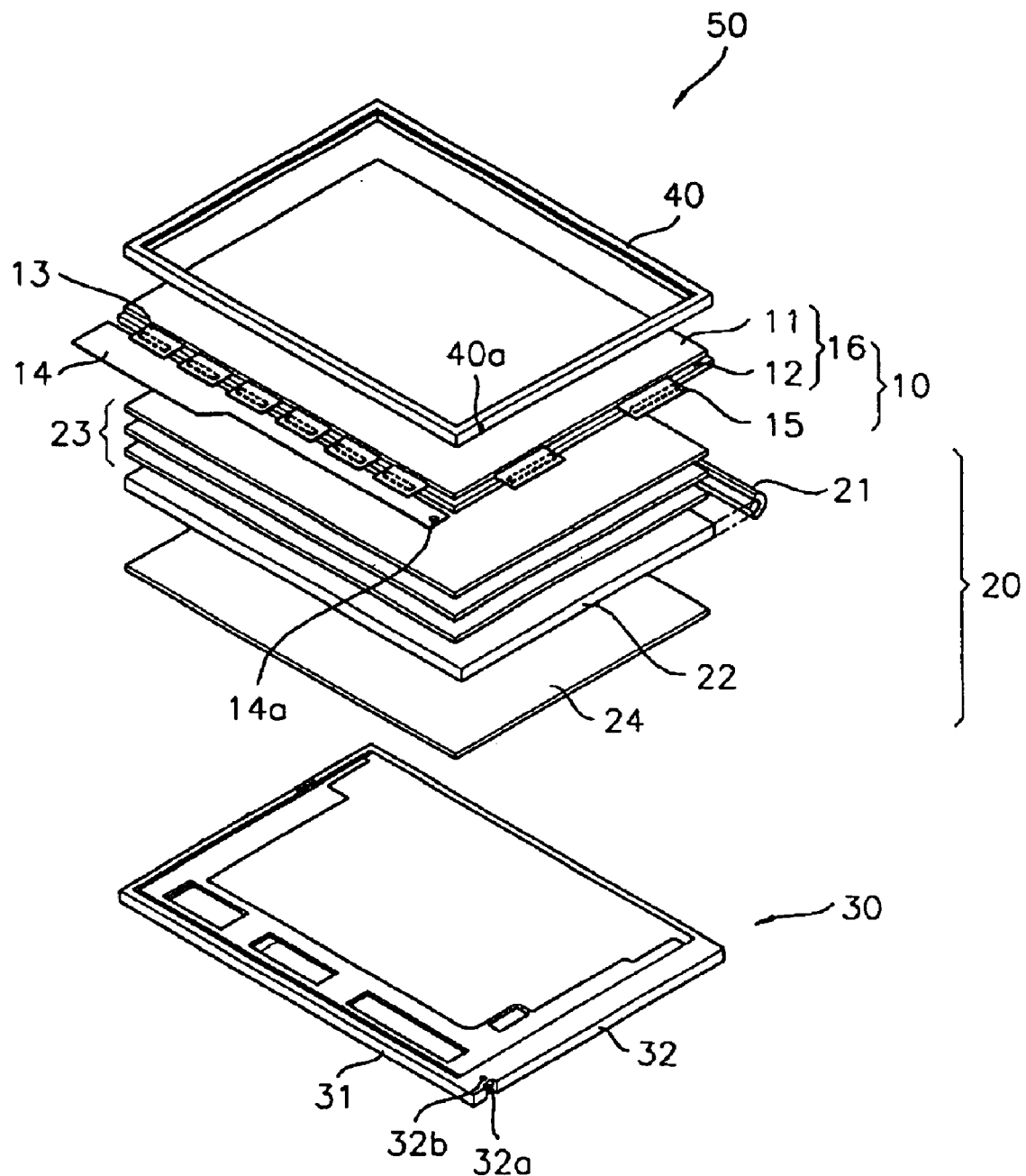
FIG. 1 is an exploded perspective view of a conventional LCD.
Figure 2:
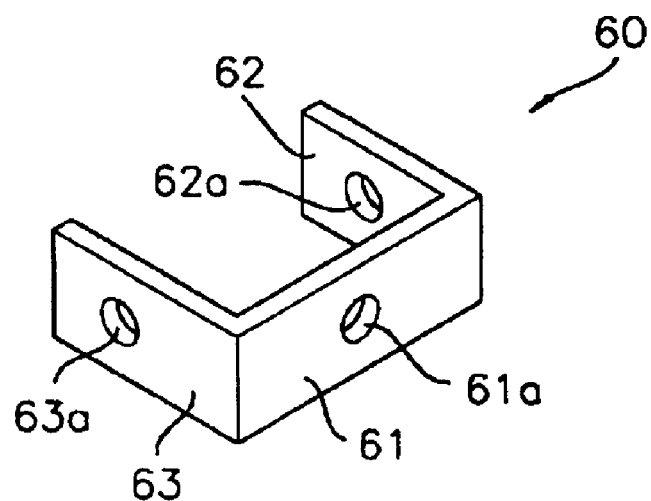
FIG. 2 is a perspective view of a conductive clip for connecting an integrated PCB and a top chassis of the LCD of FIG. 1 to the ground.
Figure 3:
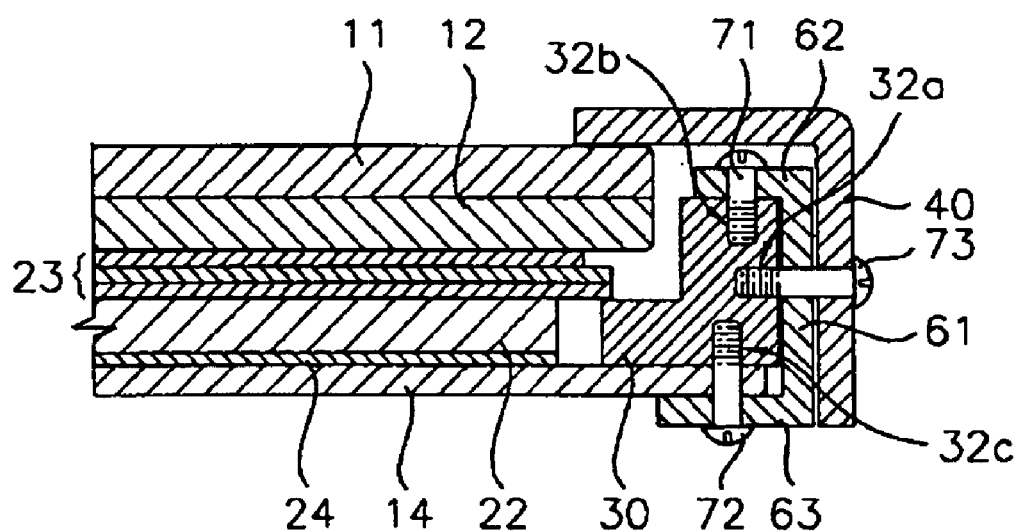
FIG. 3 is a cross-sectional view showing a coupling structure of the LCD using the conductive clip of FIG. 2.
Figure 4:
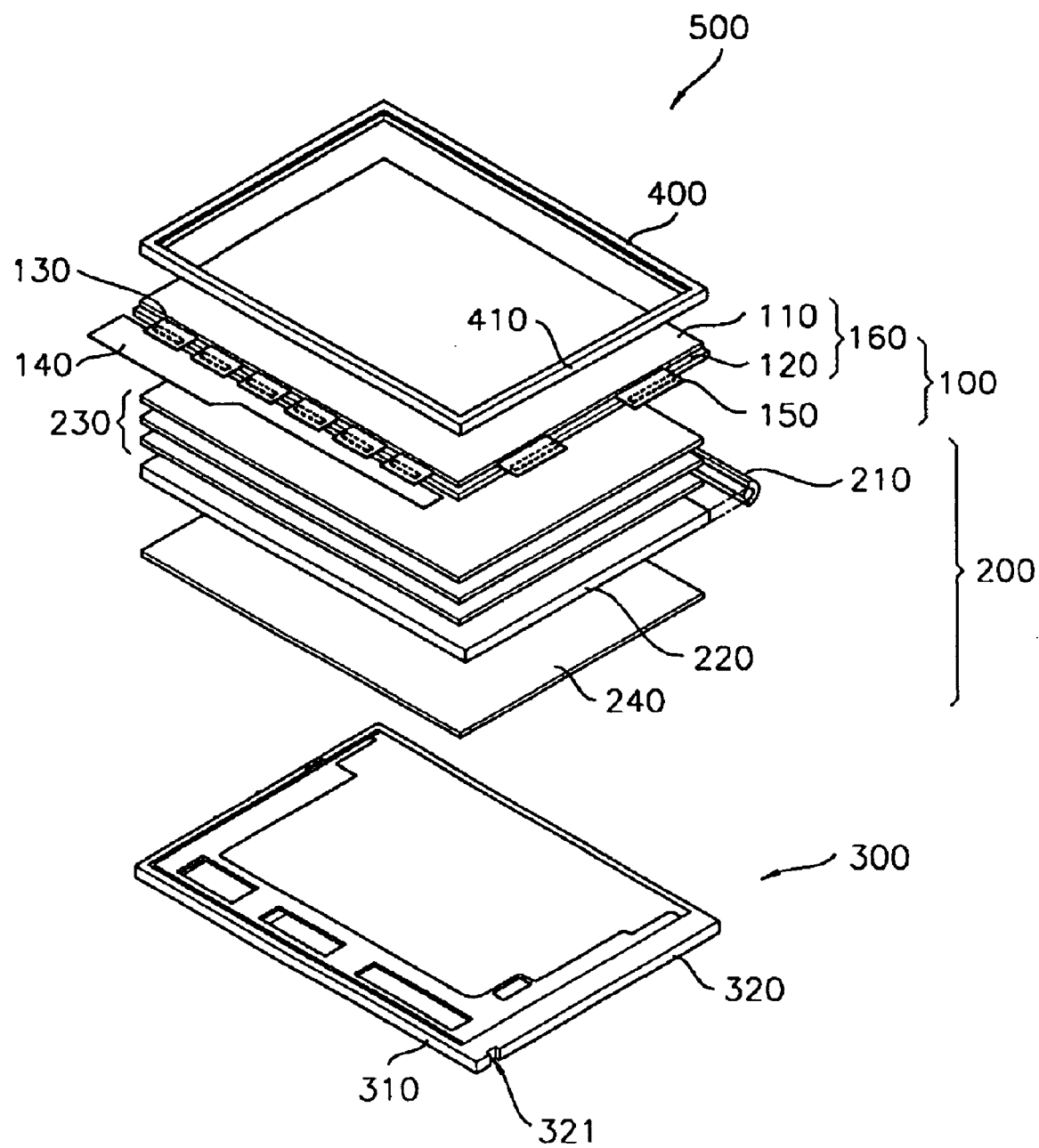
FIG. 4 is a dissembled perspective view of an LCD according to one embodiment of the present invention.

FIG. 4 is a dissembled perspective view of an LCD according to one embodiment of the present invention.

Referring to FIG. 4, an LCD 500 includes a display unit 100 for displaying an image, a backlight assembly 200 for providing a light to the display unit 100, a mold frame 300 for receiving the display unit 100 and the backlight assembly 200, and a chassis 400 for fixing the display unit 100 to the mold frame 30. Although not shown in the drawings, the LCD 500 is received within a front and rear case (not shown).

The display unit 100 comprises an LCD panel 160 and an integrated PCB 140 for controlling an operation of the LCD panel 160.

The LCD panel 160 has a thin film transistor substrate 120, a color filter substrate 110 disposed facing the thin film transistor substrate 120, and a liquid crystal layer (not shown) formed between the two substrates 110 and 120.

The thin film transistor substrate 120 includes thin film transistors and a pixel electrode arranged in a matrix form, a plurality of data lines extended in a column direction, and a plurality of gate lines extended in a row direction. The data line is connected to a source terminal of each of the thin film transistors, and the gate line is connected to a gate terminal thereof. Further, the pixel electrode is connected to a drain terminal of each of the thin film transistors.

The color filter substrate 110 includes RGB pixels as color pixels for generating a desired color while light passes therethrough, and a common electrode deposited on an entire surface of the color filter substrate 110 including the RGB pixels.

In addition, the integrated PCB 140 electrically connected through a data tape carrier package 130 to the LCD panel 160 applies a driving signal to the gate line and the data line of the LCD panel 160 in response to image signals provided from an outside. The integrated PCB 140 is connected to the data tape carrier package 130 attached to a source side of the LCD panel 160. A gate tape carrier package 150 is attached to a gate side of the LCD panel 160 to drive the gate line of the LCD panel 160 in response to the driving signal applied from the integrated PCB 140.

Below the display unit 100, there is provided the backlight assembly 200 for supplying a uniform light to the display unit 100. The backlight assembly 200 is provided with a lamp unit 210 for generating the light, and a light guiding plate 220 for changing a path of the light from the lamp unit 210 and outputting the path-changed light to the display unit 100.

Further, a plurality of optical sheets 230 is stacked on an upper surface of the light guiding plate 220. The optical sheet 230 enhances a uniformity of the brightness of the light output from the light guiding plate 220, and then provides the light of uniform brightness to the LCD panel 160. Below the light guiding plate 220, there is provided a reflection plate 240 for reflecting the light leaked from the light guiding plate 220 to increase an amount of the light output from the light guiding plate 220 to the LCD panel 160.

The backlight assembly 200 is received in the mold frame 300. Particularly, the reflection plate 240, the light guiding plate 220 and the optical sheets 230 are sequentially received in a receiving space of the mold frame 300. The lamp unit 210 is arranged adjacent to one sidewall of the light guiding plate 220.

In addition, the display unit 100 is received on an upper surface of the optical sheet 230 and is fixed to the mold frame 300 by a top chassis 400 coupled to the mold frame 300.

The data tape carrier package 130, which connects the integrated PCB 140 to the source side of the LCD panel 160, is bent toward a first sidewall 310 of the mold frame 300 by the top chassis 400. The integrated PCB 140 connected to the data tape carrier package 140 is mounted on a rear surface of the mold frame 300.

At another sidewall of the mold frame 300, i.e., a second sidewall 320 which is adjacent to the first sidewall 310 and is partially overlapped with the integrated PCB 140, there is formed a coupling portion 321 of a ground clip (not shown) for electrically connecting the integrated PCB 140 and the top chassis 400.

The coupling portion 321 is recessed by a predetermined depth from a side surface and an upper surface of the second sidewall 320 of the mold frame 300. Therefore, even though the ground clip 600 is coupled to the coupling portion 321, the ground clip 600 is not served to increase the thickness and width of the LCD 500.

Figure 5:
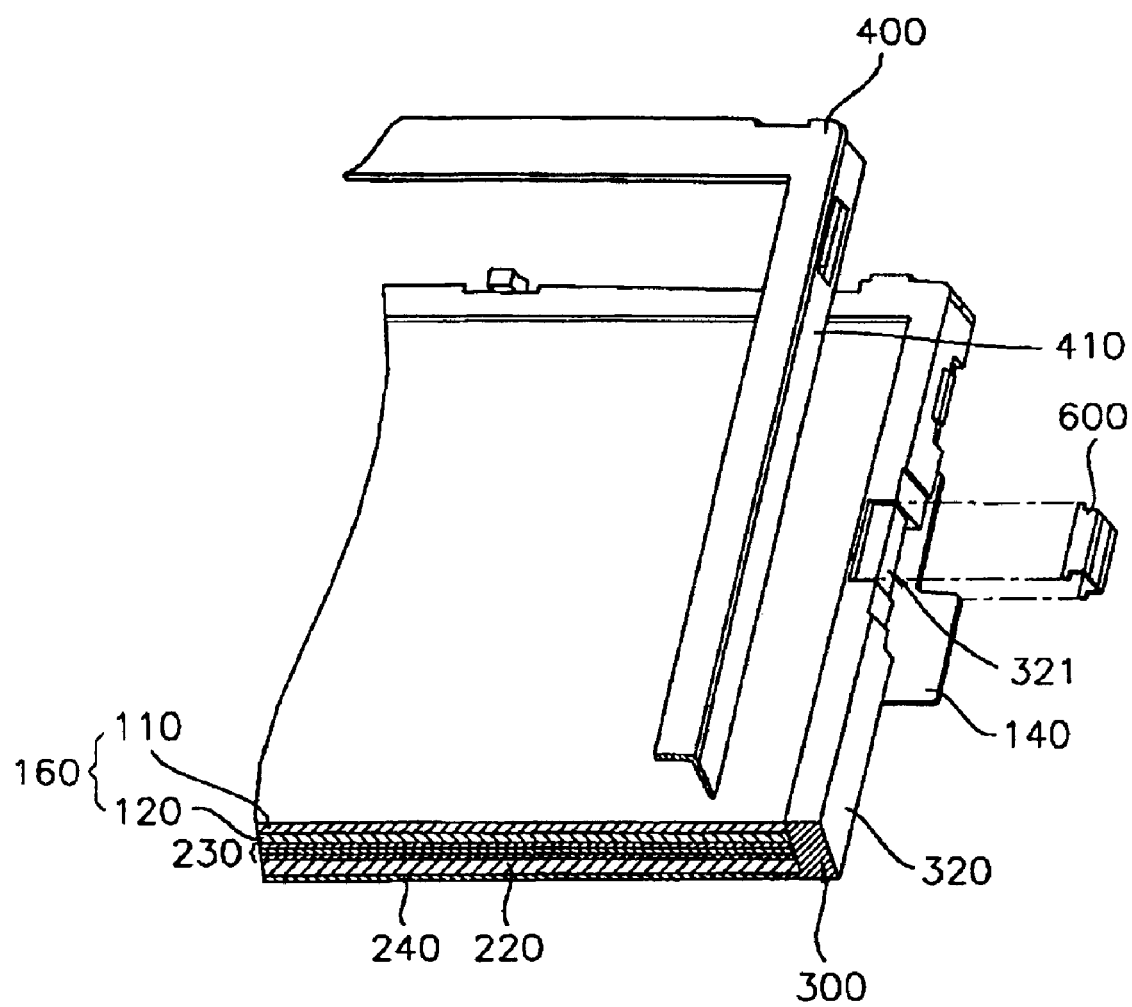
FIGS. 5 and 6 are partially enlarged perspective views showing a ground connection structure of the integrated PCB of FIG. 4.
Figure 6:
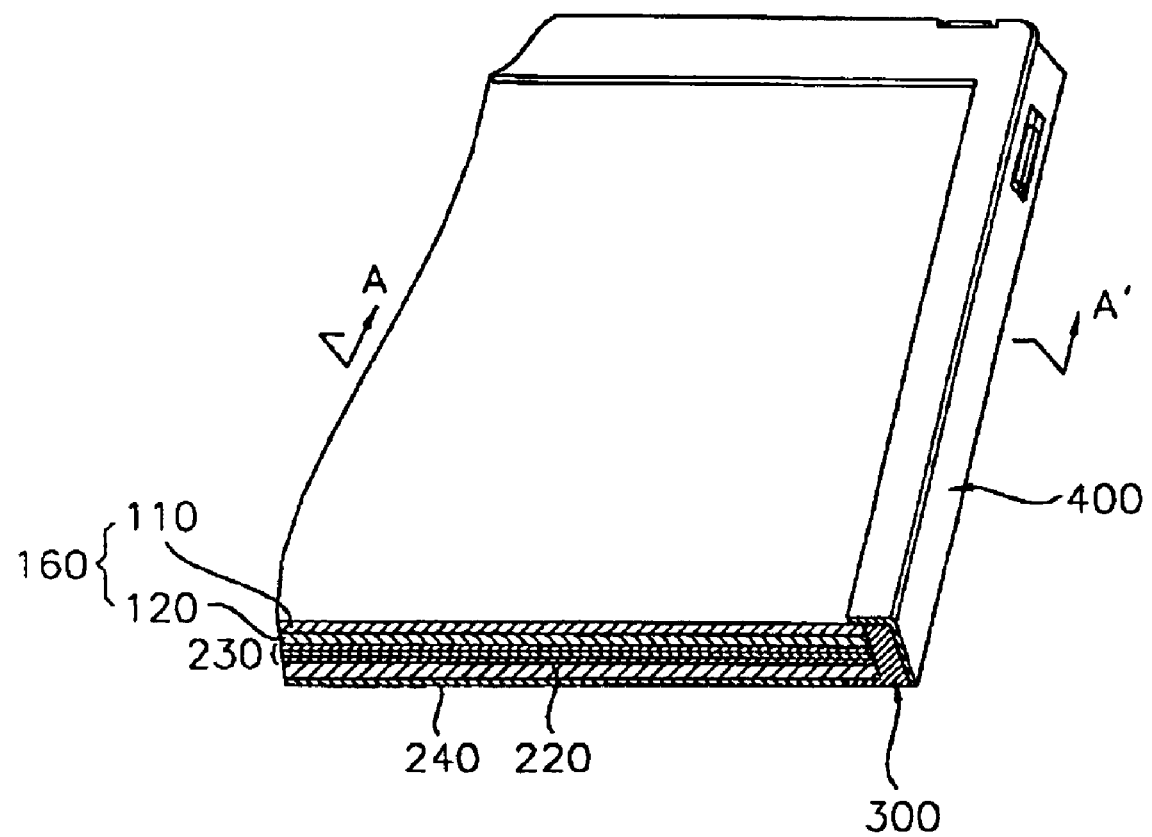

FIGS. 5 and 6 are partially enlarged perspective views showing a ground connection structure of the integrated PCB of FIG. 4.

Referring to FIGS. 4, 5 and 6, the reflection plate 240, the light guiding plate 220 and the optical sheets 230 are sequentially received in a receiving space of the mold frame 300. The lamp unit 210 is received at one side of the light guiding plate 220. The display unit 100 is received on the upper surface of the optical sheet 230. The integrated PCB 140 is bent so that the data tape carrier package 130 encloses the first sidewall 310 of the mold frame 300, and is disposed on the rear surface of the mold frame 300.

Then, the ground clip 600 is coupled to the coupling portion 321 of the second sidewall 320 together with an end of the integrated PCB 140 disposed on the rear surface of the mold frame 300. In other words, the integrated PCB 140 disposed at the rear surface of the mold frame 300 is fixed to the rear surface of the mold frame 300 by the ground clip 600 coupled to the coupling portion 321. A structure of the ground clip 600, and a coupling relationship among the ground clip 600, the integrated PCB 140 and the mold frame 300 will be described with reference to the drawings.

As shown in FIGS. 5 and 6, after the ground clip 600 is coupled to the coupling portion 321, the top chassis 400 is coupled with the mold frame 300. Due to the coupling of the top chassis 400 and the mold frame 300, the display unit 160 is fixed to the mold frame 300, and the ground clip 600 contacts an inner surface of a sidewall 410 of the top chassis 400 corresponding to the second sidewall 320 of the mold frame 300. Namely, the integrated PCB 140 maintains an electrically conductive state with the top chassis 400 by the ground clip 600.

Figure 7A:
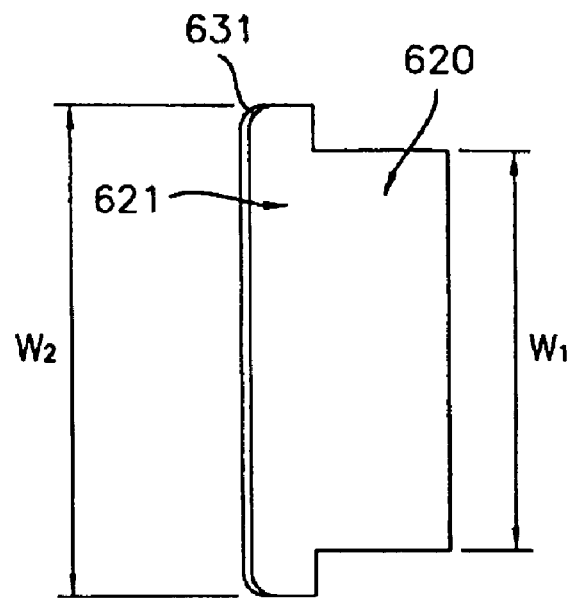
FIGS. 7A to 7C are views showing a structure of the ground clip of FIG. 5.
Figure 7B:
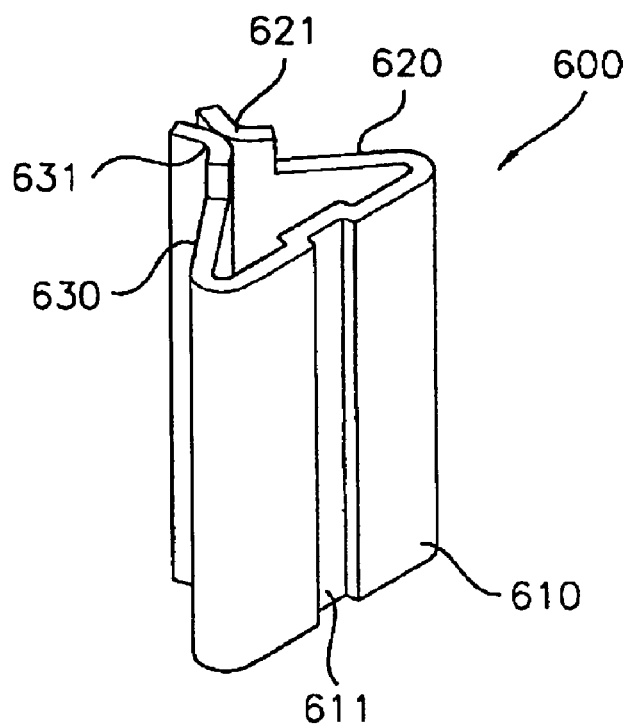
Figure 7C:
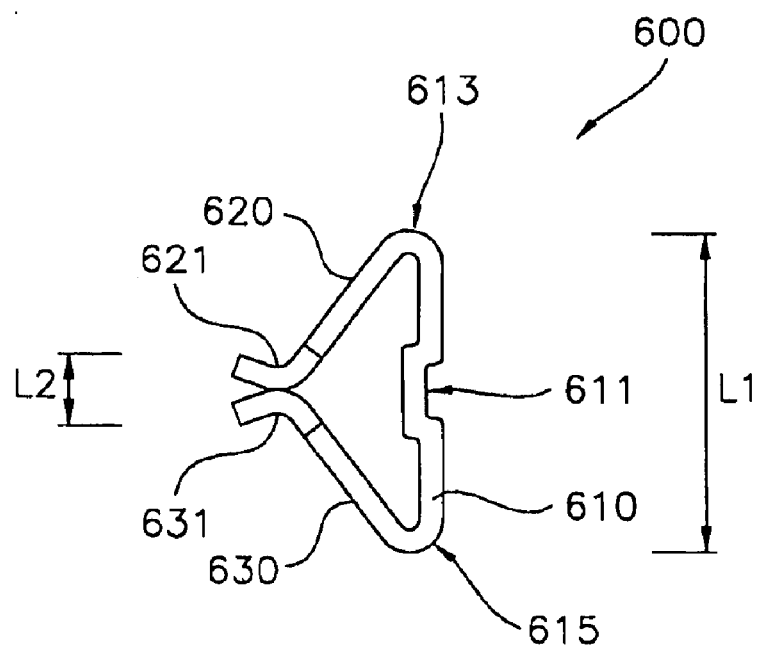

FIGS. 7A to 7C are views showing a structure of the ground clip of FIG. 5.

Referring to FIGS. 7A to 7C, the ground clip 600 comprises a body portion 610, a first wing portion 620 extended from a first end 613 of the body portion 610 to have an acute angle with respect to the body portion 610, and a second wing portion 630 extended from a second end 615 of the body portion 610, which is opposite the first end 613, to have an acute angle with respect to the body portion 610. A linear distance L2 between opposing ends of the first and second wing portions 620 and 630 is less than a length L1 between the first and second ends 613 and 615 of the body portion 610 at a free existing state without any external force applied to the ground clip 600.

A tension is exerted on the first and second ends 613 and 615, which divide the first and second wing portions 620 and 630 from the body portion 610. Therefore, as shown in FIG. 7C, the farther a distance is from the first and second ends 613 and 615, the narrower an interval is between the first wing portion 620 and the second wing portion 630. In FIG. 7C, there is shown an example in which the first and second wing portions 620 and 630 make contact with each other. However, the farther is the distance from the first and second ends 613 and 615, the stronger the tension is continuously applied, and the narrower the interval is between the first wing portion 620 and the second wing portion 630. In this case, it does not matter that the first and second wing portion 620 and 630 do not direct contact with each other.

First and second guide portions 621 and 631 are formed at respective free ends of the first and second wing portions 620 and 630. As shown in FIG. 7A, the first guide portion 621 has a width W2 wider than a width W1 of the first wing portion 620. In the same way, the second guide portion 631 has the width W2 wider than the width W1 of the second wing portion 630. In addition, free end portions of the first and second guide portions 621 and 631, which are opposite to their ends extended from the first and second wing portions 620 and 630, are bent away from each other.

There is formed a guide groove 611 recessed at a center portion of the body portion 610 of the ground clip 600 parallel with the first and second ends 613 and 615 thereof. Particularly, the guide groove 611 has an identical length to the width W1 of the body portion 610.

Figure 8A:
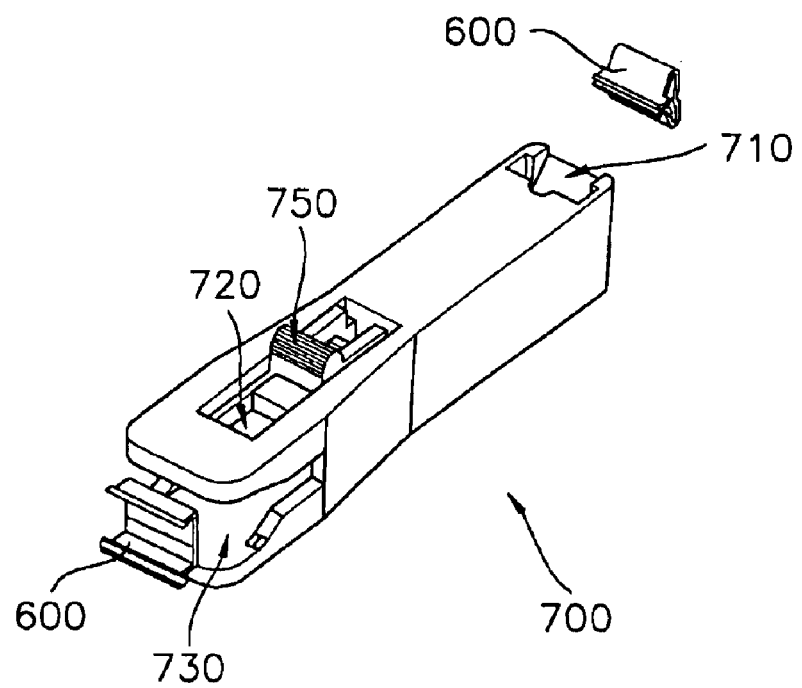
FIGS. 8A and 8B are perspective views showing a structure of a clip mounting device for coupling the ground clip of FIGS. 7A to FIG. 7C to the LCD.
Figure 8B:
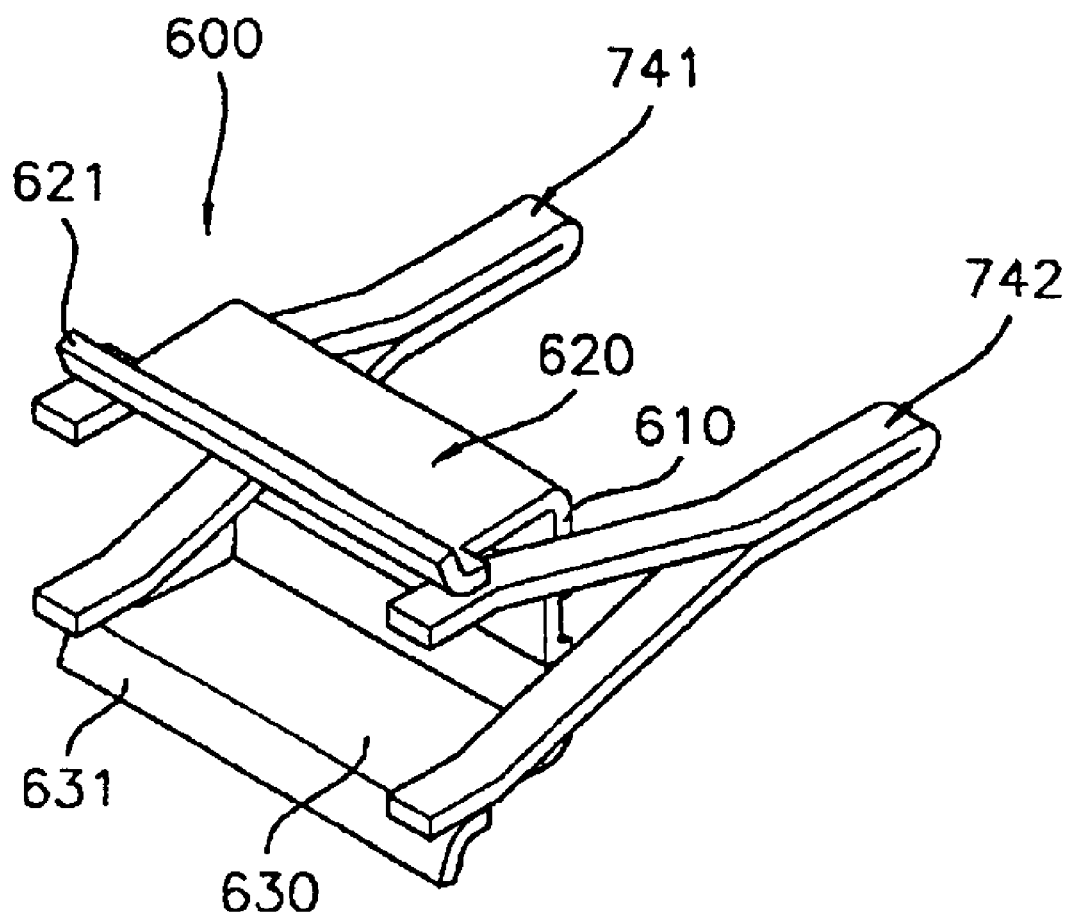
Figure 9:
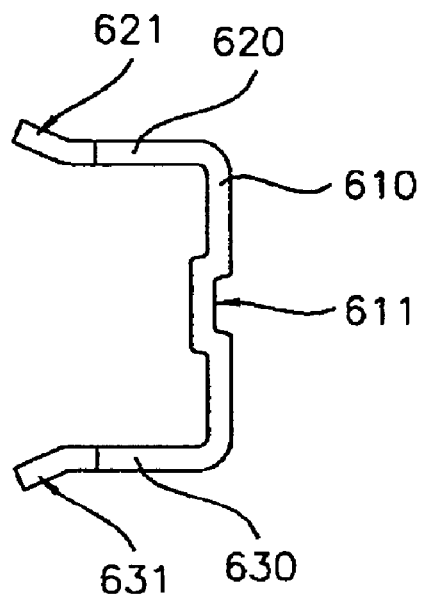
FIG. 9 is a cross-sectional view showing a structure of the ground clip deformed by the clip mounting device of FIG. 8.

FIGS. 8A and 8B are perspective views showing a structure of a clip mounting device for coupling the ground clip of FIGS. 7A to 7C to the LCD, and FIG. 9 is a cross-sectional view showing a structure of the ground clip deformed by the clip mounting device of FIG. 8.

Referring to FIGS. 8A and 8B, a clip mounting device 700 comprises an inserting hole 710 into which the ground clip 600 is inserted, a receiving portion 720 for receiving the ground clip 600 inserted into the inserting hole 710, an inserting portion 730 into which the coupling portion 321 of the mold frame 300 and one end portion of the integrated PCB 140 are inserted, first and second V-shape springs 741 and 742 attached to right and left sides of the inserting portion 730, and a driver 750 for pushing out the ground clip 600 received in the receiving portion 720 toward the first and second springs 741 and 742.

More specifically, in a state that the integrated PCB 140 is mounted on the rear surface of the mold frame 300, one end portion of the integrated PCB 140 and the coupling portion 321 of the mold frame 300 are inserted into the inserting portion 730 of the clip mounting device 700.

The ground clip 600 received in the receiving portion 720 through the inserting hole 710 is pushed by the driver 750, and is slid toward the inserting portion 730. One end portion of the driver 750 contacts the guide groove 611 formed at the body portion 610 of the ground clip 600 received in the receiving portion 720.

The driver 750 pushes out the ground clip 600 toward the inserting portion 730, so that the first and second guide portions 621 and 631 of the ground clip 600 are slid along an outside portion of the first and second springs 741 and 742 as shown in FIG. 8B.

The first and second guide portions 621 and 631 are gradually spaced apart from each other by elastic force of the first and second springs 741 and 742, so that the interval between the first and second wing portions 620 and 630 becomes wider.

In this situation, if the driver 750 is further slid to the inserting portion 730, the ground clip 600 is separated from the first and second springs 741 and 742 so that the first and second wing portions 620 and 630 of the ground clip 600 make contact with the upper surface of the second sidewall 320 of the mold frame 300 and the rear surface of the integrated PCB 140.

Particularly, as shown in FIG. 9, the first and second wing portions 620 and 630 of the ground clip 600, which are spaced apart from each other by the first and second springs 741 and 742, are restored to the initial state by the tension applied to the first and second ends 613 and 615 of the ground clip 600.

In other words, the first wing portion 620 makes contact with the upper surface of the second sidewall 320 of the mold frame 300 inserted into the inserting portion 730 of the clip mounting device 700. The second wing portion 630 makes contact with the rear surface of the integrated PCB 140 received in the inserting portion 730.

A structure of the LCD 500 to which the ground clip 600 is coupled using the clip mounting device 700, as described above, is shown in FIG. 10.

Figure 10:
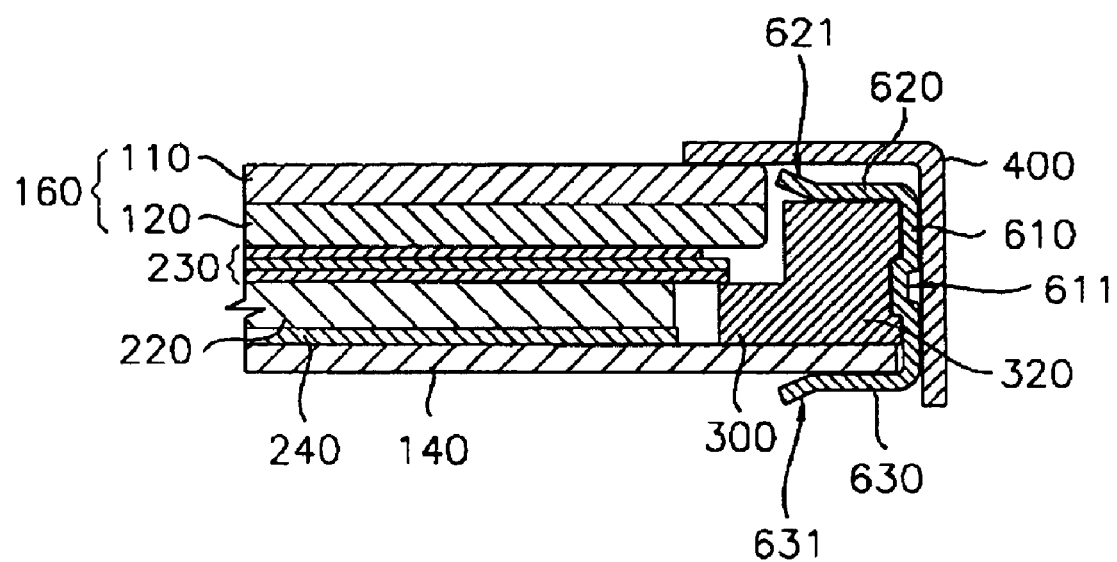
FIG. 10 is a cross-sectional view taken along the line A—A' of the LCD of FIG. 6.

FIG. 10 is a cross-sectional view taken along the line A—A' of the LCD shown in FIG. 6.

Referring to FIG. 10, the reflection plate 240, the light guiding plate 220, the optical sheets 230 and the display unit 100 are sequentially received in the receiving space of the mold frame 300. The integrated PCB 140 is mounted on the rear surface of the mold frame 300.

The first wing portion 620 of the ground clip 600 makes contact with the upper surface of the second sidewall 320 of the mold frame 300, and the second wing portion 630 of the ground clip 600 makes contact with the rear surface of the integrated PCB 140 mounted on the rear surface of the mold frame 300. At this time, a restoring force of the first and second wing portions 620 and 630 of the ground clip 600, which is generated by the tension described above, is exerted on the upper surface of the second sidewall 320 and the rear surface of the integrated PCB 140. Therefore, the integrated PCB 140 is stably coupled to the rear surface of the mold frame 300, while making contact with the ground clip 600.

Then, if the top chassis 400 is coupled to the mold frame 300, the inner surface of the sidewall 410 of the top chassis 400 contacts the body portion 610 of the ground clip 600. Therefore, the integrated PCB 140 is electrically connected to the top chassis 400 by the ground clip 600.

Figure 11:
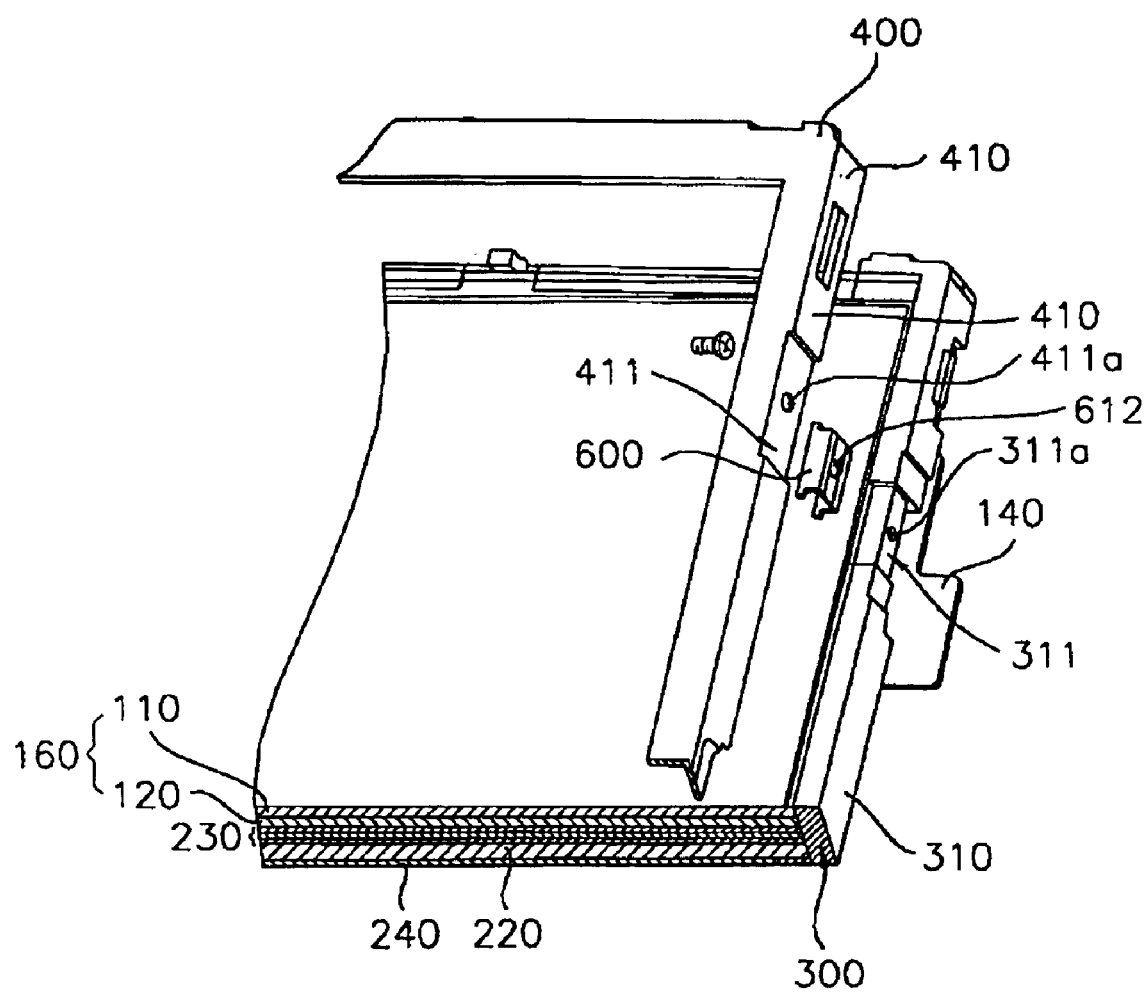
FIGS. 11 and 12 are partially enlarged perspective views showing a ground connection structure of the integrated PCB according to another embodiment of the present invention.
Figure 12:
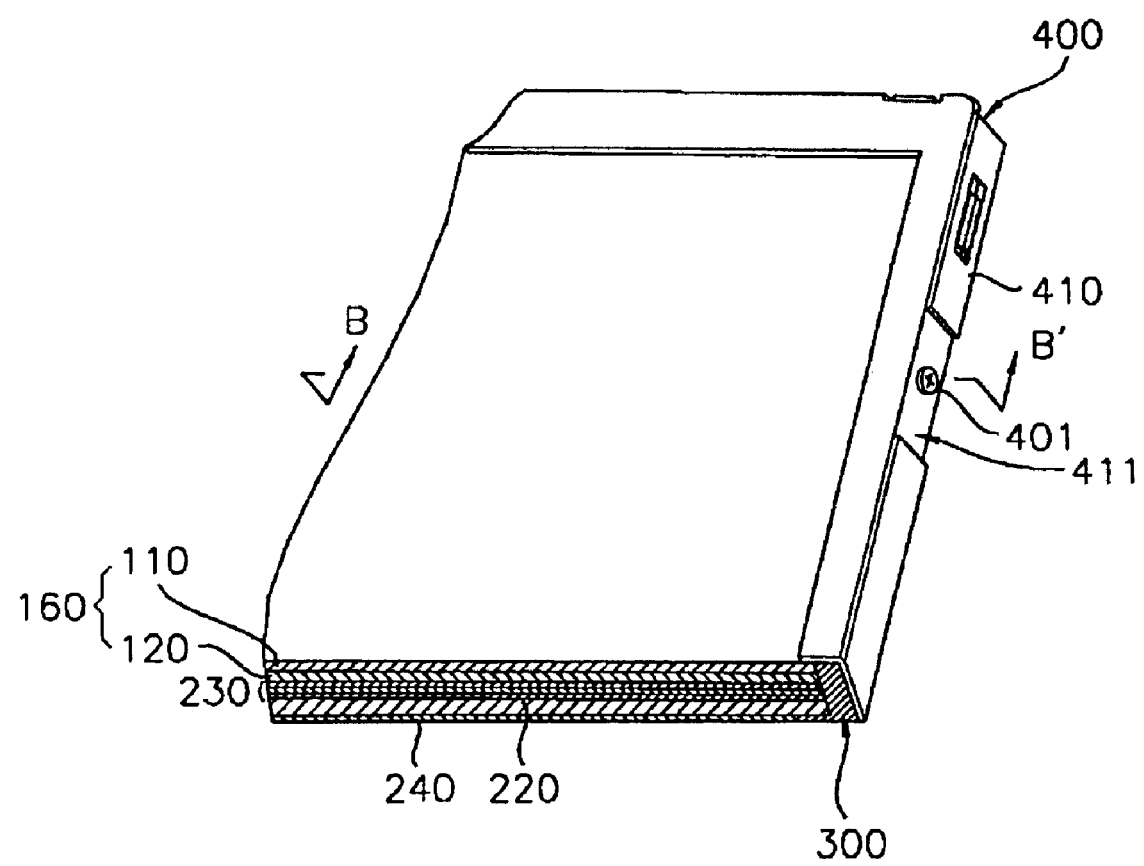

FIGS. 11 and 12 are partially enlarged perspective views showing a ground connection structure of the integrated PCB according to another embodiment of the present invention. In the present embodiment, the same reference numerals are used to denote the same elements of the LCD according to the previous embodiment of the present invention.

Referring to FIG. 11, a reflection plate 240, a light guiding plate 220 and optical sheets 230 are sequentially received in the receiving space of a mold frame 300. A lamp unit 210 is received at a side of the light guiding plate 220. A display unit 100 is settled on the upper surface of the optical sheet 230. The integrated PCB 140 is bent so that a data tape carrier package 130 encloses a first sidewall 310 of the mold frame 300, and is disposed on a rear surface of the mold frame 300.

Meanwhile, at another sidewall of the mold frame 300, i.e., a second sidewall 320 which is adjacent to the first sidewall 310 and partially overlapped with the integrated PCB 140, there is formed a coupling portion 321 of a ground clip (not shown) for electrically connecting the integrated PCB 140 and a top chassis 400.

The coupling portion 321 is recessed by a predetermined depth from a side surface and an upper surface of the second sidewall 320 of the mold frame 300. Therefore, even though a ground clip 600 is coupled to the coupling portion 321, the ground clip 600 does not increase a thickness or width of the LCD 500. Further, a blind hole 321a for a screw 401 is formed at the coupling portion 321 so as to enhance the coupling force between the ground clip 600 and the top chassis 400.

The ground clip 600 coupled to the coupling portion 321 fixes the integrated PCB 140 mounted on the rear surface of the mold frame 300. A first coupling hole 612, corresponding to the blind hole 321a formed at the coupling portion 321, is formed at the ground clip 600.

Further, at the sidewall of the top chassis 400 coupled to the mold frame 300 to fix the display unit 160 to the mold frame 300, there is formed a second coupling hole 411a corresponding to the first coupling hole 612.

A peripheral portion of the second coupling hole 411a is recessed to receive a head portion of the screw 401 in order to prevent an increase in an overall width of the LCD 500 due to the screw 401, the screw is fastened to the blind hole 321a formed at the coupling portion 321 through the second coupling hole 411a and the first coupling hole 612.

As shown in FIGS. 11 and 12, if the screw 401 is fastened through the second coupling hole 411a and the first coupling hole 612 to the blind hole 321a formed at the coupling portion 321, the integrated PCB 140, the mold frame 300, the ground clip 600 and the top chassis 400 are coupled to each other to be electrically connected to each other.

Figure 13A:
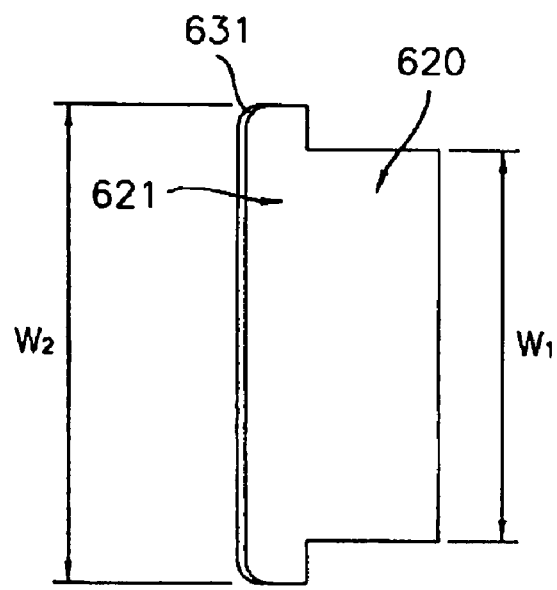
FIGS. 13A to 13C are views showing a structure of the ground clip of FIG. 11.
Figure 13B:
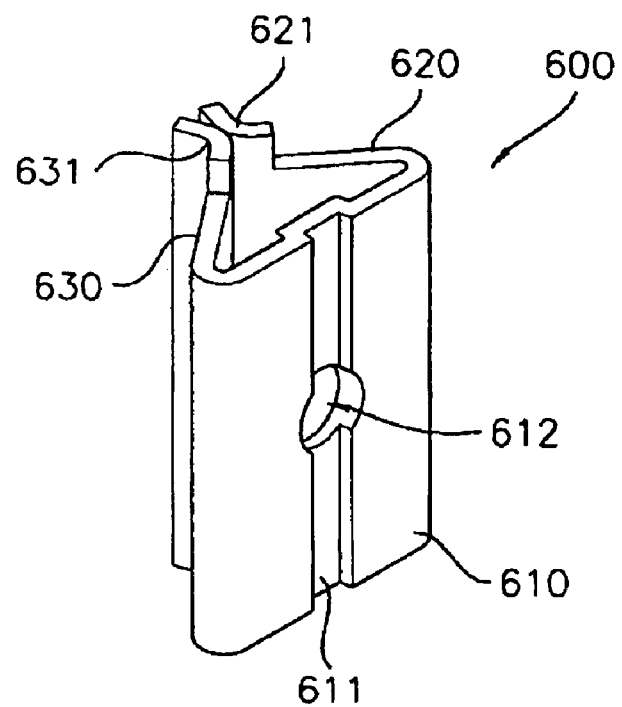
Figure 13C:
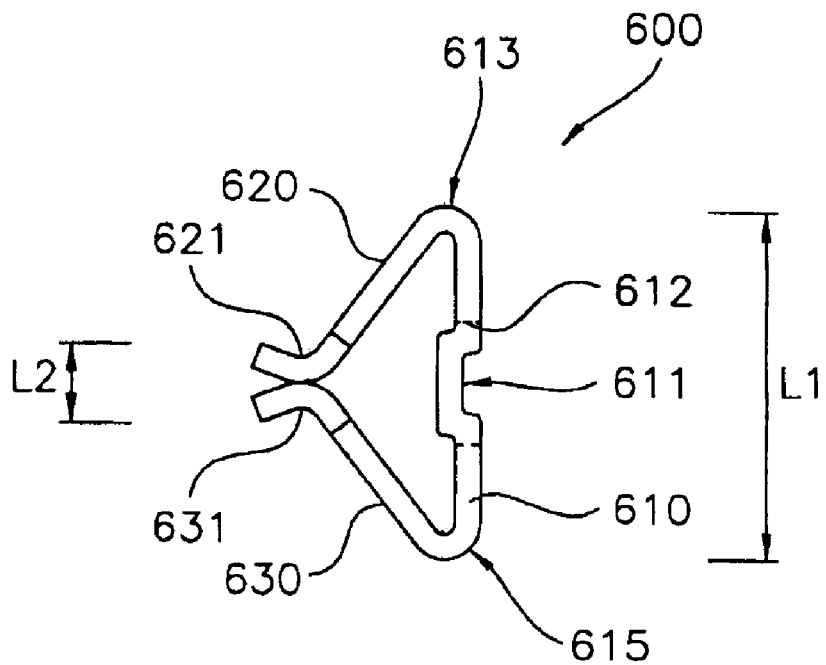

FIGS. 13A to 13C are views showing a structure of the ground clip shown in FIG. 11.

Referring to FIGS. 13A to 13C, the ground clip 600 comprises a body portion 610, a first wing portion 620 extended from a first end 613 of the body portion 610 to have an acute angle with respect to the body portion 610, and a second wing portion 630 extended from a second end 615 of the body portion 610 to have an acute angle with respect to the body portion. A certain magnitude of tension is exerted on the first and second ends 613 and 615 to maintain a linear distance L2 between opposing ends of the first and second wing portions 620 and 630 to be less than a length L1 between the first and second ends of the body portion 610 at a free existing state without any external force applied to the ground clip 600.

Further, first and second guide portions 621 and 631 are formed at an end of the first and second wing portions 620 and 630, respectively. As shown in FIG. 13A, the first guide portion 621 has a width W2 which is wider than a width W1 of the first wing portion 620. In the same way, the second guide portion 631 has the width W2 which is wider than the width W1 of the second wing portion 630. In addition, free end portions of the first and second guide portions 621 and 631, which are opposite to their ends extended from the first and second wing portions 620 and 630, are bent away from each other.

At a center portion of the body portion 610 of the ground clip 600, there is formed a guide groove 611 parallel with the first and second ends of the body portion 610. The guide groove 611 has an identical length to the width W1 of the body portion 610. The first coupling hole 612 is formed at a center portion of the guide groove 611.

Figure 14:
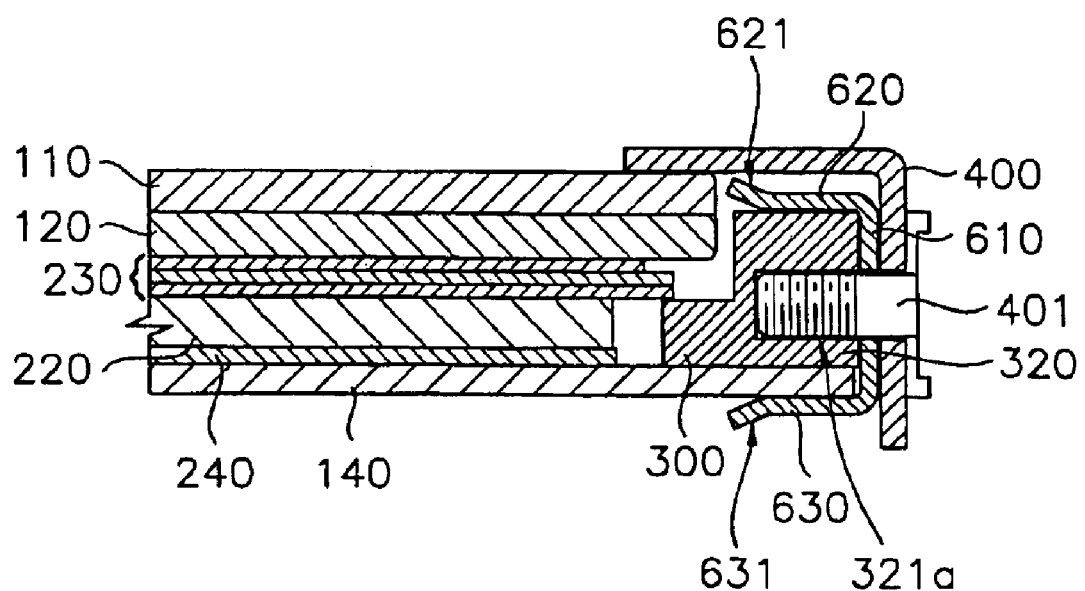
FIG. 14 is a cross-sectional view taken along the line B—B' of the LCD of FIG. 12.

FIG. 14 is a cross-sectional view taken along the line B—B' of the LCD in FIG. 12.

Referring to FIG. 14, the reflection plate 240, the light guiding plate 220, the optical sheet 230 and the display unit 100 are sequentially received in the receiving space of the mold frame 300. Also, the integrated PCB 140 is mounted on the rear surface of the mold frame 300.

The first wing portion 620 of the ground clip 600 contacts the upper surface of the second sidewall 320 of the mold frame 300, and the second wing portion 630 of the ground clip 600 contacts the rear surface of the integrated PCB 140 mounted on the rear surface of the mold frame 300. The restoring force of the first and second wing portions 620 and 630 of the ground clip 600, which is generated by the tension described above, is exerted on the upper surface of the second sidewall 320 and the rear surface of the integrated PCB 140. Therefore, the integrated PCB 140 is stably coupled to the rear surface of the mold frame 300, while making contact with the ground clip 600.

Then, if the top chassis 400 is coupled to the mold frame 300, the inner surface of the sidewall 410 of the top chassis 400 makes contact with the body portion 610 of the ground clip 600. Then, the screw 401 is fastened through the second coupling hole 411a and the first coupling hole 612 to the blind hole 321a formed at the coupling portion 321. Therefore, the integrated PCB 140 maintains a state where the integrated PCB 140 is electrically connected to the top chassis 400 by the ground clip 600.

According to the LCD as described above, the ground clip functions to fix the integrated PCB to the rear surface of the mold frame and to electrically connect the integrated PCB to the top chassis. The ground clip comprises a body portion, a first wing portion extended from a first end of the body portion, and a second wing portion extended from a second end of the body portion such that a distance between free ends of the first and second wing portions is less than a distance between the first and second ends of the body portion at a free existing state without any external force applied thereto. Therefore, where the first and second wing portions are spread out from each other, they tend to be restored to their original state, during which a sort of restoring force is generated. As a result, the mold frame and the integrated PCB are pressed to each other by the restoring force of the first and second wing portions.

Thus, the ground clip can stably fix the integrated PCB to the rear surface of the mold frame without using a separate fixing member, and can be attached to the sidewall of the mold frame. Further, since a separate fixing member is not used, the number of assembling processes is reduced, and thus a fabricating cost is reduced.

Furthermore, in the LCD according to another embodiment of the present invention, at each sidewall of the ground clip and the top chassis, there is formed a coupling hole. At the sidewall of the mold frame is formed a blind hole. The ground clip and the top chassis are fixed to the mold frame by a screw. Therefore, the ground clip maintains electrically stable connection with the integrated PCB and the top chassis.

While the present invention has been described in detail with reference to an exemplary embodiment, it should be understood that various changes, substitutions and alterations can be made hereto without departing from the spirit and scope of the invention as defined by the appended claims.

What is claimed is:

1. An LCD comprising:
    a backlight assembly for generating a light;
    an LCD panel for receiving the light and displaying an image;
    a printed circuit board for providing a control signal to the LCD panel to control an operation of the LCD panel;
    a receiving container receiving the backlight assembly and the LCD panel and including a recess formed in a side surface;
    a chassis coupled to the receiving container, for fixing a position of the LCD panel; and
    a conductive member coupled to the receiving container and the printed circuit board between the receiving container and the chassis, for fixing the printed circuit board to a rear surface of the receiving container and electrically connecting the printed circuit board and the chassis, the conductive member comprising: a body portion, coupled to the receiving container and the printed circuit board and located between the receiving container, and the chassis, for fixing the printed circuit board to a rear surface of the receiving container, and for electrically connecting the printed circuit board to the chassis, the body portion including a guide groove corresponding to the recess of the receiving container and being coupled to the side surface of the receiving container; a first wing portion extended from a first end of the body portion to be coupled to an upper surface of a sidewall of the receiving container; and a second wing portion extended from a second end of the body portion to be coupled to the printed circuit board positioned at the rear surface of the receiving container;

wherein a linear distance between free ends of the first wing portion and the second wing portion is less than a distance between the first and second ends of the body portion where the conductive member is at a free-existing state, and the receiving container and the printed circuit board are pressed by a restoring force of the first and second wing portions where the conductive member is coupled thereto.

2. The LCD of claim 1, wherein the body portion has an outer surface connected to the chassis.

3. The LCD of claim 1, wherein the body portion comprises a first coupling hole penetrating therethrough.

4. The LCD of claim 3, wherein the receiving container has a blind hole corresponding to the first coupling hole at the sidewall thereof.

5. The LCD of claim 4, wherein the chassis comprises a second coupling hole penetrating therethrough and corresponding to the first coupling hole.

6. The LCD of claim 5, further comprising a screw fastened through the second coupling hole and the first coupling hole to the blind hole, for fixing the chassis and the conductive member to the receiving container.

7. The LCD of claim 1, wherein the second wing portion is electrically connected to a ground pad of the printed circuit board, to electrically connect the printed circuit board to the chassis.

8. The LCD of claim 1, wherein an interval between the first wing portion and the second wing portion is narrower as being further from the first and second ends of the body portion.

* * * * *